(No Model.)

W. L. FRISBIE.
HANDLE FOR TOOLS.

No. 539,426. Patented May 21, 1895.

Witnesses:
Mark W. Dewey
R. S. Dewey

Inventor.
William L. Frisbie
By C. H. Duell
his Attorney.

UNITED STATES PATENT OFFICE.

WILLIAM L. FRISBIE, OF SYRACUSE, NEW YORK, ASSIGNOR TO THE SYRACUSE SPECIALTY MANUFACTURING COMPANY, OF SAME PLACE.

HANDLE FOR TOOLS.

SPECIFICATION forming part of Letters Patent No. 539,426, dated May 21, 1895.

Application filed February 15, 1895. Serial No. 538,498. (No model.)

*To all whom it may concern:*

Be it known that I, WILLIAM L. FRISBIE, of Syracuse, in the county of Onondaga, in the State of New York, have invented new and useful Improvements in Handles for Tools, of which the following, taken in connection with the accompanying drawings, is a full, clear, and exact description.

The invention relates to certain novel improvements in handles for tools, being particularly adapted for curry combs; and the principal object is to provide a shank for the handle proper, which will be stronger and less expensive to manufacture than those heretofore produced.

With this object in view, the invention consists essentially in providing the tang portion of a metal shank with a perforation, near its outer end, and reinforcing or strengthening said shank by passing a bent wire through said perforation, and securing one end of said wire between the tool or improvement to be handled and that portion of the shank which is to be secured to said tool or improvement, and the invention further consists in certain other details of construction, as will be hereinafter more fully explained and specifically set forth in the claims.

Figure 1:
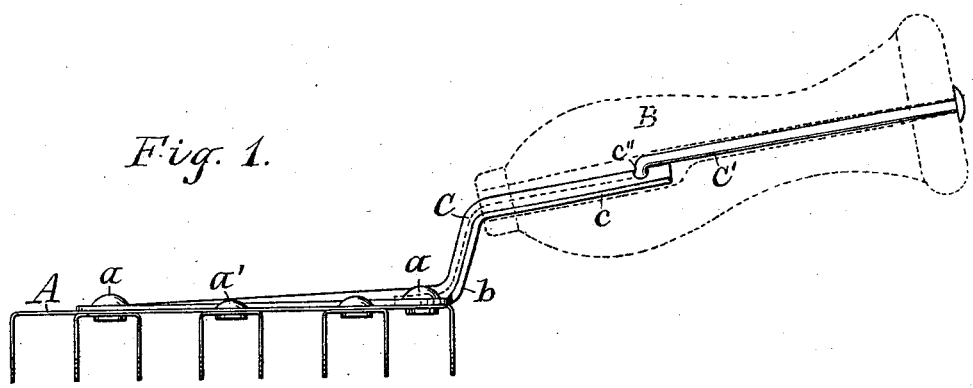
Figure 2:
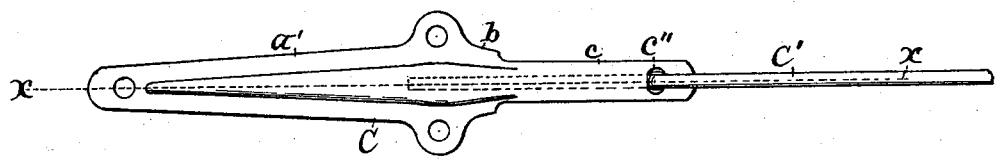
Figure 3:
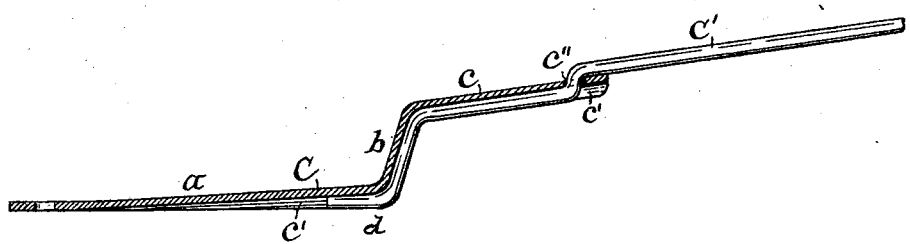

Referring to the accompanying drawings, Figure 1 represents a side view of a curry-comb provided with my improved handle, said handle being shown in dotted lines in order to more clearly show the attachment of the handle proper to the shank. Fig. 2 is a top plan view of the shank and reinforcing-wire detached; and Fig. 3, a central longitudinal sectional view of the shank, taken on line X X of Fig. 2, showing the reinforcing-wire in full lines.

In the drawings, the letter A indicates the tool, which, in this instance, is a curry comb of the ordinary form of construction, and B the handle which may be formed of wood or other suitable material.

The letter C indicates the shank which is designed to attach the handle to the curry comb. This shank is preferably constructed of sheet metal and is of a shape common to such tools or implements, that is to say, it is formed with the usual thumb-rest portion $b$, intermediate of its length, a straight or body portion, $a'$, provided with rivet-holes which receive the rivets $a$, by means of which the shank is attached to the tool, and a tang $a'$, which enters the handle B. The shank is struck up, a portion of its length, with a depression or groove, $c'$, in its underside, which tapers toward the front or forward end of the body of said shank, for the purpose hereinafter explained.

It has been the custom, in making sheet metal shanks, to have the tang extend entirely through the handle and clinched in the end thereof, but it was found that a great saving in stock and expense in manufacture could be effected by shortening the tang, and, at the same time, a much stronger and more durable shank could be produced by providing a suitable reinforcing or strengthening attachment thereto. This is accomplished by providing the shortened tang with a perforation, $c^2$, near its end, and passing through said perforation a wire, $C'$, bent to conform to the shape of the shank and lie closely within the depression or groove in the under side thereof, as clearly shown in Fig. 3. In this position, when the body of the shank is riveted to the tool or other implement, the end of the wire will be rigidly confined between said body and the tool or implement, and thus the shank will be materially strengthened and supported at its weakest portion, the closely lying wire serving as a brace to stiffen the shank along nearly its entire length, and as an attaching means for the handle which is perforated longitudinally to receive the tang and greater portion of the wire, the outer end of which extends slightly beyond the handle and is upset or riveted to firmly secure said handle to the shank.

It will be obvious that the wire not only stiffens or strengthens the shank, but permits of a much cheaper form of construction than where the shank and long tang are formed entirely of one piece of sheet metal, as such shank must be cut and formed from a much longer strip of metal, the width of which is the same throughout its length as is the widest portion after it is stamped out.

Having thus fully described my invention, what I claim as new, and desire to secure by Letters Patent, is—

1. The combination, with a tool or other implement and the handle thereof, of a metal shank having a perforation in its tang and a wire passing through said perforation and bent to conform to the shape of said shank, one end of said wire being adapted to be confined between the tool or implement and the body portion of the shank, substantially as specified.

2. The combination, with a tool or other implement and the handle thereof, of a metal shank formed with a longitudinal depression or groove, for a portion of its length, and having a perforation in its tang, and a wire passing through said perforation and bent to conform to the shape of said shank, one end of said wire lying in said depression or groove and confined between the tool or implement and the body portion of the shank, substantially as specified.

3. The combination, with a tool or other implement and the handle thereof, of a metal shank formed with a longitudinal depression or groove, for a portion of its length, and having a perforation in its tang, and a wire passing through said perforation and bent to conform to the shape of said shank, one end of said wire lying in said depression or groove and confined between the tool or implement and the body of the shank and the other end upset or riveted to secure the handle to the said shank, substantially as specified.

4. The combination, with the back of a curry comb and the handle thereof, of a metal shank, grooved longitudinally and bent intermediate of its length and its tang provided with a perforation, and a wire passing through said perforation and lying in said groove, said wire having one end confined between the body of the shank and the back of said comb, and the other end passing through the handle and upset or riveted against the end thereof, substantially as specified.

In testimony whereof I have hereunto signed my name.

WILLIAM L. FRISBIE. [L. S.]

Witnesses:
H. M. SEAMANS,
R. S. DEWEY.